United States Patent [19]

Lam

[11] Patent Number: 4,760,420
[45] Date of Patent: Jul. 26, 1988

[54] SHUTTER MECHANISM FOR A CAMERA

[75] Inventor: Chiu K. Lam, North Point, Hong Kong

[73] Assignee: Famous Instrument Limited, Hong Kong

[21] Appl. No.: 87,207

[22] Filed: Aug. 20, 1987

[30] Foreign Application Priority Data

Aug. 21, 1986 [GB] United Kingdom ............... 8620387

[51] Int. Cl.$^4$ ........................... G03B 7/08; G03B 9/08
[52] U.S. Cl. ...................................... 354/440; 354/230
[58] Field of Search ..................... 354/230, 438, 440

[56] References Cited

U.S. PATENT DOCUMENTS 3,233,531  2/1966  Fairbank ........................... 354/438

FOREIGN PATENT DOCUMENTS 1591496  9/1975  United Kingdom .
1407256  6/1981  United Kingdom .

Primary Examiner—Michael L. Gellner
Attorney, Agent, or Firm—Lowe, Price, LeBlanc, Becker & Shur

[57] ABSTRACT

A shutter mechanism for a camera comprises overlapping plates which are pivotally mounted and connected by a pin sliding in slots so that the plates move in unison. Springs bias the plates to an overlapping position, covering a hole in the camera body which leads to a lens. The plate is struck by a lever which urges the plates against springs causing them to pivot away, until the lever strikes a stop at which point the plates still overlap sufficiently to cover the hole. After the lever strikes the stop the plates continue to move under their own momentum to open up an aperture bounded by the edges.

A magnetic control plate with pawls is attracted towards the overlapping plates by an electromagnet so that the pawls engage racks on the plates to arrest the plates at a particular aperture setting. The electromagnet is switched off to allow plate to return under the action of spring, relesing the plates which close the aperture under the action of springs.

17 Claims, 3 Drawing Sheets

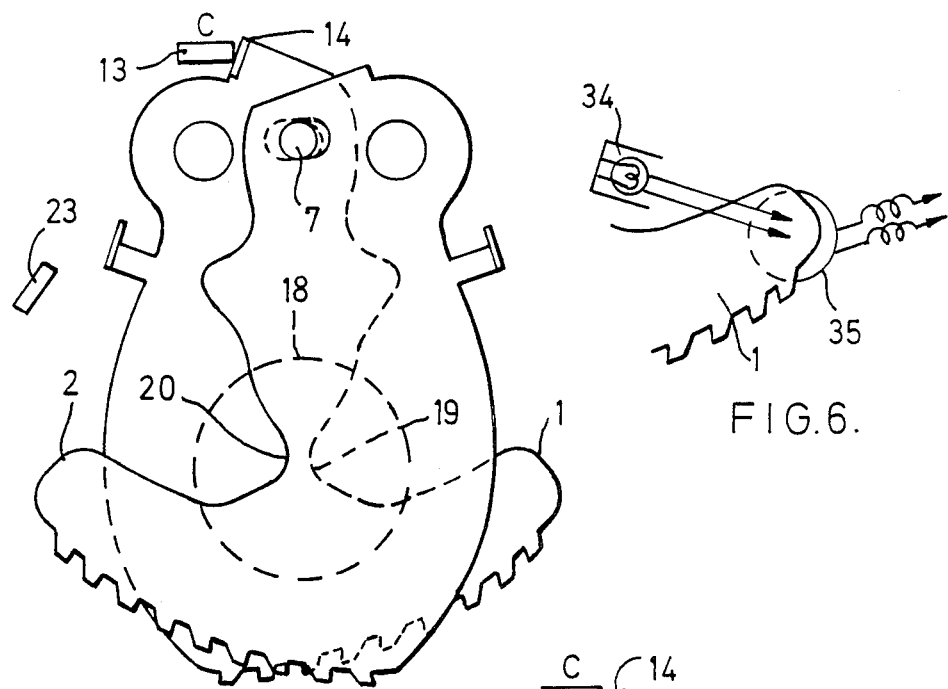
FIG.6.
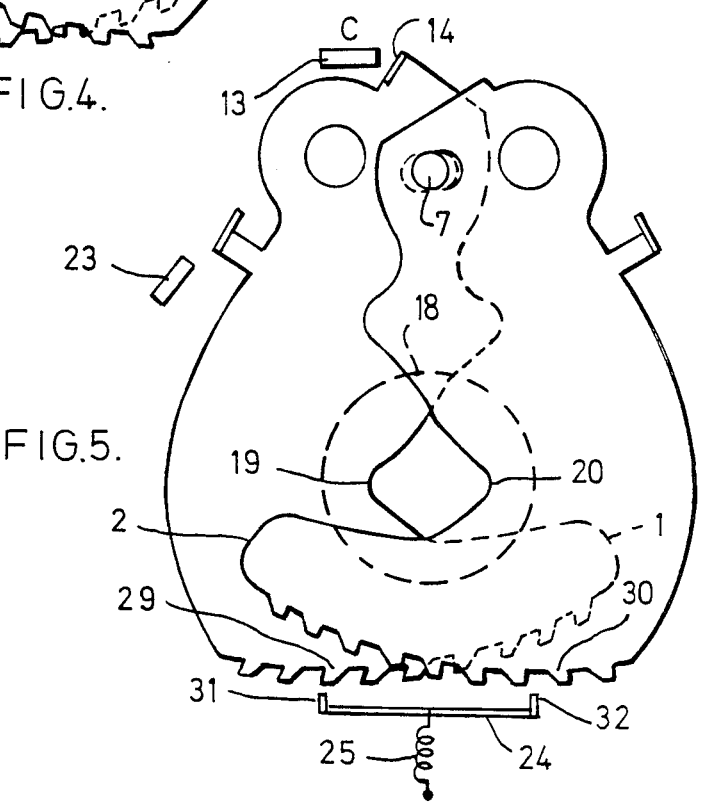
FIG.4.
FIG.5.

SHUTTER MECHANISM FOR A CAMERA

INTRODUCTION

The present invention relates to a shutter mechanism for a camera in which the shutter, controlling exposure time of the film, also controls the aperture.

Such a system comprises a pair of overlapping plates which, when overlapping, form a barrier to light entering the camera through the camera lens, and when moved apart expose the film to incoming light.

SUMMARY OF INVENTION

The present invention provides a camera having a shutter system comprising a plurality of plates which are coupled together to move in unison, the plates being biased to an initial position in which they overlap in a region forming a barrier to light entering the camera through a lens thereof, and means for striking a said plate to cause the plates to move slidingly relative to one another against the biassing means to an open position where the plates form between them an aperture for exposing a film in the camera to light entering through the lens, and aperture control means for stopping and holding the plates in the open position to expose the film and then releasing them, the plates sliding back towards the initial position under the action of the biassing means to close the aperture.

Preferably, two pivotably mounted plates are provided. The plates sliding across one another as they pivot. Preferably only one of the plates is struck.

Preferably the means striking the plate imparts momentum to the plates whilst they are overlapping in said region and the momentum of the plates carries them to a position forming the aperture.

Preferably the means striking the plate comprises a spring loaded arm which is released from a preloaded condition and moves under the force of the spring to strike the plate, the arm bearing against the plate to accelerate the plate, and a stop is provided to limit movement of the arm and allow continued movement of the plates under their own momentum.

In this way when the plates are stopped the control means is not acting directly against the force of the striking means.

Preferably the striking means comprises a pivotably mounted arm which is biassed towards the plate by a spring. The arm is held in a first position against the force of the spring by a shutter release and pivots from the first position to a second position where it strikes the plate, the arm continuing its movement to a third position, where it abuts a stop pivoting the plate before it.

Preferably the control means comprises a latching means which is arranged to engage a plate to arrest its movement. The latching means may comprise a latch or control plate which engages with a rack on a plate. Teeth of the rack may be spaced at intervals corresponding to standard aperture sizes.

The control means may comprises a magnetic control plate biassed to a first position and urged into a second position where it engages the rack by an electromagnet. The electromagnet may be actuated shortly before a desired aperture is reached to allow for mechanical delay in the control plate engaging the rack. A single control plate may be used and engage a rack on each plate, to avoid sideways loading.

However, to provide for fine control of the plate position, and hence fine aperture control, a rack may be provided on each plate with the teeth of the respective racks offset from one another so that the control plate may engage against a tooth of one plate, whilst falling between teeth on the other.

The aperture control means may be preset to be activated to engage a plate or plates when a predetermined aperture is reached.

The aperture control means releases the plates to allow them to return to the initial position. The time period during which the plates are held may be controlled electronically. A light detector may be provided to release the plates automatically when a calculated exposure has been achieved.

In another embodiment the exposure time may be set and a light detector, positioned in front of the shutter system used to calculate the required aperture.

By providing a rack on a plate and releasing a latch to engage the rack a predetermined time after the shutter release lever has been actuated the plate may be stopped at a predetermined position. However, inaccuracies inherent in the timing of the mechanical action, particularly after wear, may cause errors in the actual aperture obtained. Means may be provided for sensing the position of a plate, and hence the aperture obtained and this may be used to actuate the aperture control means.

Other features and advantage of the invention will be apparent from the following detailed description.

BRIEF DESCRIPTION OF DRAWINGS

FIGS. 4 and 5 are views illustrating the operation of the mechanism of FIG. 1; and FIG. 6 illustrates a modification of the mechanism of FIG. 1.

DESCRIPTION OF PREFERRED EMBODIMENT

Figure 1:
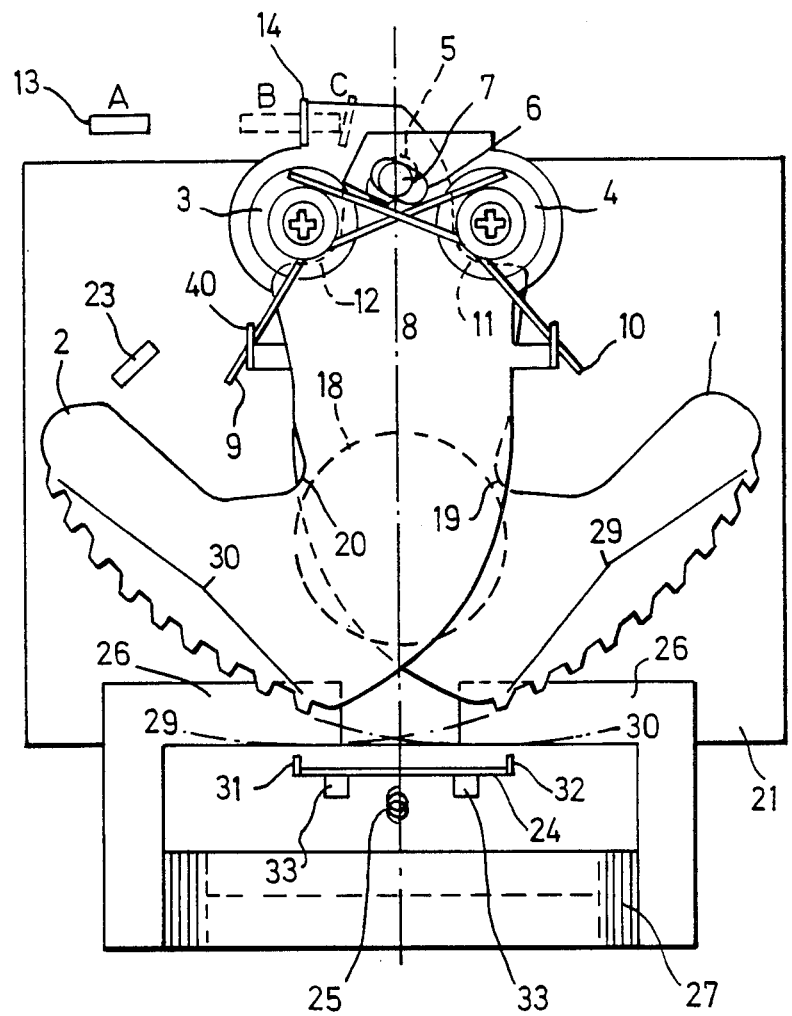
FIG. 1 is a front view of a shutter mechanism according to the invention.

A shutter mechanism in accordance with the invention comprises two thin metal shutter plates 1 and 2; a magnetic control plate 24 and an electromagnet 26. The shutter plates 1 and 2 act to provide both a shutter and to define the aperture. These plates are mounted onto the dark chamber 21 of a camera body and behind a lens of the camera (not shown). These plates are free to pivot about bushings 3 and 4. The plates coupled together by a sliding pin 7 which passes through oblong holes 5 and 6 in the plates in a region where the plates overlap. When either plate swings, the action is carried by the corresponding oblong hole to the sliding pin 7 and then to the other plate, so that the two plates will swing in opposite directions in unison and symmetrically about the dotted line 8. Two weak springs 9 and 10 are mounted about the bushings 3 and 4 respectively. An arm of spring 9 engages behind an ear 40 on plate 1 and another arm of the spring engages behind bushing 4, to urged plate 1 in a counter clockwise direction. Similarly plate 2 is urged in the clockwise direction. The two plates are stopped at an initial, rest position seen in FIG. 1 by edges 11 and 12 respectively which bear against the bushings 4 and 3 respectively.

Figure 3:
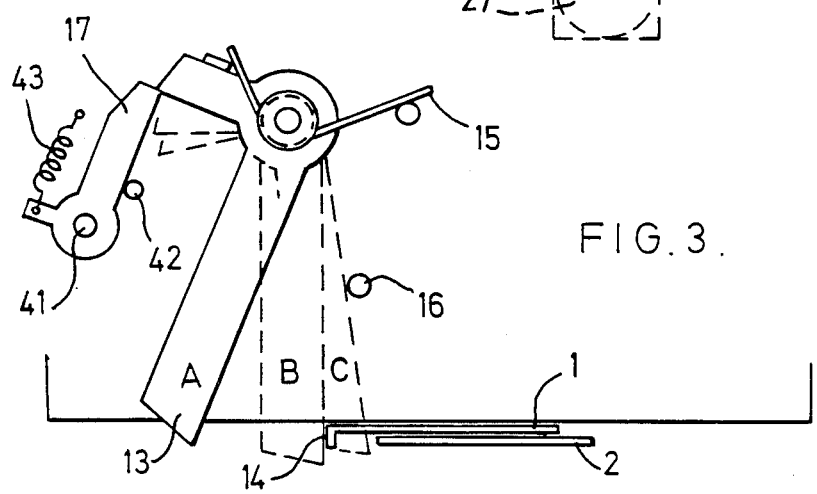
FIG. 3 is a plan view of the apparatus of FIG. 1.

A shutter lever 13 is loaded by a strong spring 15 which biases the lever to sweep quickly and strongly from position A to position C shown in FIG. 1 and FIG. 3. The lever is stopped at position C by a stopper pin 16. The shutter lever 13 is normally held at position A by the latching action of a shutter release lever 17 which pivots on a pin 41 and is biassed against a stop 42 by a spring 43. When the camera shutter button (not shown) is pressed to take a picture, the shutter release lever 17 is pushed by the shutter button counterclockwise, thereby releasing the shutter lever 13 which sweep quickly from position A to position C. This will open the shutter (as explained in detail below), and the picture is taken. When a film in the camera is advanced to the next frame to get ready for the next shot, the shutter lever 13 is pushed by the film winding mechanism (not shown) back to position A where it is latched again by shutter release lever 17. This sets the shutter/aperture mechanism ready for the next shot.

During the action of taking a shot, the shutter lever 13 sweeps quickly from position A to C, hitting the top corner 14 of plate 1 at position B. This drives plate 1 clockwise and plate 2 counterclockwise. When the shutter lever 13 reaches position C, points 19 and 20 of plates 1 and 2 are still just overlapping (FIG. 4), and no light can pass through a hole 18 provided on the dark chamber 21 in line with the camera lens (not shown), to pass to the film 22 at the back. However, although the shutter lever 13 is stopped at position C, plates 1 and 2 continue to swing clockwise and counterclockwise respectively, due to the momentum therein. As they continue to swing, points 19 and 20 no longer overlap, and a small hole appears. This is equivalent to a small aperture and light can now pass through it from the lens and hole 18 to expose the film 22. As plates 1 and 2 swing further on, the aperture size increases, due to the shape of the edge of the plates, as illustrated in FIG. 5. Finally, all of the hole 18 is exposed, and this is equivalent to maximum aperture. The plate 1 then hits a stopper plate 23 so that both plates 1 and 2 are stopped and then begin to swing back due to the actin of springs 9 and 10. As they swing back the aperture decreases until it is closed when plates 1 and 2 reach position C again, where they are stopped by the shutter lever 13 which remains at position C under the force of spring 15. When the shutter lever 13 is pushed back to position A during film advance, the plates 1 and 2 return further to the position of FIG. 1, and are ready for the next exposure action. In summary, as described so far, each time when the shutter button is pressed, the aperture opens up from the smallest value up to the maximum value and closes back again, with a time period (exposure time) determined by the springs and the masses of the moving parts.

Figure 2:
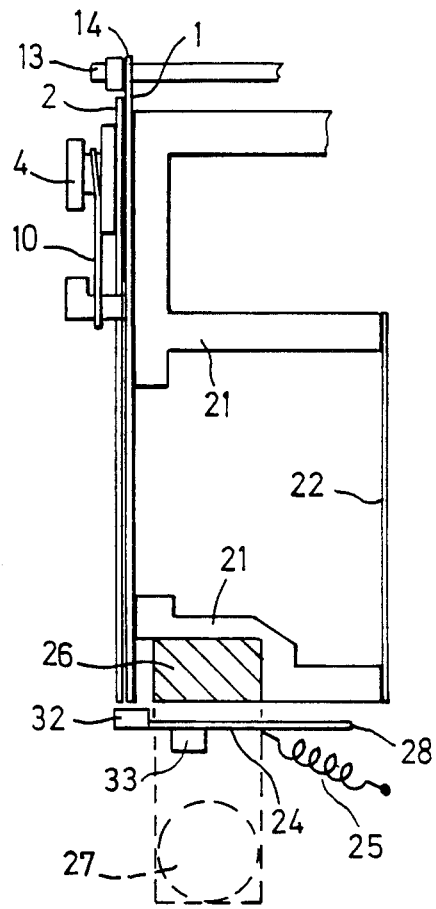
FIG. 2 is a side view of the apparatus of FIG. 1.

To control the aperture and the exposure time electronically, a small, light, control plate 24 made of magnetically soft material is provided and mounted below plates 1 and 2 extending perpendicular to the plane of the plates. The control plate 24 is hinged or pivotally mounted at 28, FIG. 2, and is loaded on its underside by a weak spring 25 pulling it against stopper 33. Above the control plate 24 is an electromagnet 26 energised by solenoid 27. There is a small gap between the control plate 24 and the electromagnet 26. The edges 31 and 32 of the control plate 24 are turned up towards the plates 1 and 2. These edges 31 and 32 are very near to but do not touch the teeth 29 and 30 forming racks on the edges of the plates 1 and 2 as the plates swing or as the plates are in their rest position (FIG. 2). When the plates 1 and 2 swing, the teeth 29 and 30 move close to and in front of the edges 31 and 32 (FIG. 5 and the dashed lines of FIG. 1). To obtain a desired aperture size, an electric pulse is applied to the solenoid 27 at the correct moment when the positions of plates 1 and 2 are such that the aperture is just opening up to the desired size. The control plate 24 is thus attracted by the electromagnet 26 against the weak spring 25 and quickly flips over towards and beyond the moving teeth 29 and 30, to engage the plates between the teeth. This will catch the plates 1 and 2 and stop them, with the desired aperture size. To compensate for the slight delay of the control plate 24 due to its inertia, the electric pulse is applied slightly before the desired aperture size is reached. The teeth are arranged to give predetermined aperture sizes The teeth on one plate may be offset relative to the teeth on the other plate so that only one set at a time is engaged by the plate. This allows for fine aperture control whilst allowing for larger teeth..

In place of the teeth 29, 30 the plate edges may be roughened, to allow for very fine control of the aperture size. A rough surface on control plate 24 may be used to engage the plate edges.

To control the exposure time (shutter speed), the pulse duration applied to the electromagnet can be controlled by the electronic circuit which generates the pulse. As long as the pulse exists and the magnet is on the plates are held and the aperture remains open. As the desired exposure time elapses, the pulse is turned off, and the control plate 24 returns to the stopper 33 due to the action of spring 25, freeing plates 1 and 2 which return to the position where plate 2 abuts the lever 13 (FIG. 4), closing the aperture and thus completing the electronically controlled exposure. To give a controlled total exposure time, the mechanical swinging times of plate 1 and 2 during opening up and closing can be taken into consideration when setting the pulse duration.

It is important to have a method to determine when the desired aperture is reached so that the pulse can be applied at the correct moment. There are many ways to accomplish this. One way is to use a light metering device or optical sensor to detect the position of the plates 1 and 2, as illustrated in FIG. 6. A light source 34 partly blocked by plate 1 shines onto an optical sensor 35 behind plate 1, this light and sensor being shielded from affecting the film 22. As plate 1 moves, the amount of light reaching the sensor varies, and the electrical signal thus produced from the sensor will be related to the position of plate 1. This signal can therefore be used to control the generation of the control pulse.

A variation of this method is to use the light from the object to be photographed to illuminate the sensor. This will transform the control system into a closed-loop system reacting to the light from the object, and thus becomes an automatic exposure system, where the aperture can be controlled by the brightness of the object or surroundings.

A third method is a further enhancement of the above, whereby the sensor is placed inside the dark chamber and facing the film. It detects the actual light from the object reaching the film through the lens and aperture, and uses this information to control the aperture (e.g. stopping the aperture when the illumination of the film is high enough). This is therefore a Through-The-Lens automatic exposure system.

Yet another method is to generate the control pulse after a certain delay time after the shutter lever 13 hits the stopper pin 16. The longer the delay, the larger the aperture opens before the control pulse is applied to stop it. This delay time is generated by an electronic circuit and can be controlled by an optical sensor pointing to the object to be photographed, making this method also a kind of automatic exposure system.

In all above examples, the exposure time (shutter speed) can be controlled by controlling duration of the pulse in a special relation (or programme or formula) to the aperture used, providing an automatic programmed exposure system.

The above examples illustrate the flexibility and powerfulness of this shutter/aperture mechanism. The method of control, however, is not limited to the above examples. For example presettable controls may be provided for actuating the control plate 24 to set the aperture and for releasing the control plate to close the aperture after a set time.

To provide a synchronised trigger for electronic flash to be used with the camera, a terminal of a flash trigger circuit can be connected to plate 1 via bushing 3, and another terminal is connected to the stopper plate 23. When plate 1 swings up against the stopper plate 23, i.e. with the aperture fully opened, electrical contact between the plate and stopper is made and the flash triggered. If it is required to trigger the flash with the aperture not fully open, the other terminal of the trigger circuit can be electrically connected to the control plate 24 via spring 25. When the aperture is stopped by control plate 24, electrical contact is made with plate 1 and the flash is triggered. These two systems may be used together. The first as an automatic flash system, causing the flash to operate whenever full aperture is reached. The second as an override system which can be used to make the flash operate when the plates are stopped by the aperture control means, i.e. as a fill in flash or flash at small aperture settings..

To minimise the inertia of the control plate 24, the control plate 24 can be constructed of a small thick piece of magnetic material bonded to a thin and light plate of strong but non-magnetic material.

Various modifications will be apparent to those in the art, for example, the methods of loading the springs 9, 10, 15 and 25, and the construction of the shutter lever 13 and shutter release lever 17, as well as the shape of the electromagnet 26 and solenoid 27 may be varied, but the whole mechanism is still within the scope of this patent. Also the manner of mounting the control plate may be varied, for example, mounting the edge of the plate in a socket and using the spring 25 to draw the plate into the socket as well as bias the control plate away from the shutter plates.

The plates 1 and 2 may be made of magnetically soft material. When the control pulse is applied, the plates 1 and 2 are also pulled directly by the electromagnet 26, besides being controlled by the control plate 24. This is a variation which may be applied when the actual dimensions of the mechanism allow or require an additional electromagnetic force to help control the plates 1 and 2.

In some applications, an electromagnet, for example in a similar position to the position of electromagnet 26 may be used to control the plates 1 and 2 directly by pulling them towards the magnet and so against the dark chamber 21 and stopping them by the friction thus PRODUCED. The plates (or at least one of the plates) may be of magnetic material, that is attracted by a magnet, or may be formed with at least a portion of magnetic material.

Because of the speed with which the plates move during opening it may be desirable to bias the control plate 24, by a spring or the like, into a position engaging the plates, the electromagnet pulling the control plate away from the shutter plates. Just prior to operating the shutter mechanism the electromagnet is activated to pull the control plate away. The magnet is then deactivated to release the control plate to arrest the shutter plates. The time period taken to release the control plate is faster than the time period to energise the electromagnet sufficiently to attract the control plate against the force of the spring. The normal exposure time is a longer time period than that for the plates to reach a minimum aperture setting, and so this allows more time to energise the electromagnet to attract the control plate away from the shutter plates at the end of an exposure period.

It is desired to include all such modifications as fall within the scope of the accompanying claims.

I claim:

1. A camera having a shutter system comprising a plurality of plates which are coupled together to move in unison, the plates being biassed to an initial position in which they overlap in a region forming a barrier to light entering the camera through a lens thereof, means for striking a said plate to cause the plates to move slidingly relative to one another against the biassing means to an open position where the plates form between them an aperture for exposing a film in the camera to light entering through the lens, and aperture control means for stopping and holding the plates in a selected one of a plurality of different open positions which define different aperture sizes and for a controlled time period to expose the film and then releasing the plates, the plates sliding back towards the initial position under the action of the biassing means to close the aperture.

2. A camera as claimed in claim 1, wherein the plates are pivotally mounted to swing about their respective pivots.

3. A camera as claimed in claim 1, wherein said striking means imparts momentum to the plates whilst they are overlapping in said region and the momentum of the plates carries them to a position forming said aperture.

4. A camera as claimed in claim 1, wherein said striking means comprises a spring loaded arm which is released from a preloaded condition on actuation of the shutter and moves under the force of the spring to strike the plate, the arm bearing against the plate to accelerate the plate, and a stop is provided to limit movement of the arm and allow continued movement of the plates under their own momentum.

5. A camera as claimed in claim 1, wherein the aperture control means holds the plates in the open position for a manually preset predetermined time period.

6. A camera as claimed in claim 1, wherein the aperture control means holds the plates in an open position for a time period determined electronically using a light metering device.

7. A camera as claimed in claim 1, wherein the aperture control means comprises a member to engage an edge of a plate to arrest its movement and hold the plate, and then movable to release the plate after an exposure time period.

8. A camera as claimed in claim 7, wherein the member is a latch and engages a rack provided on an edge of plate.

9. A camera as claimed in claim 8, wherein the member engages both plates.

10. A camera as claimed in claim 8, wherein a rack is provided on an edge of each plate and teeth of each rack are offset relative to each other so that the latch engages positively the rack of one of the plates.

11. A camera as claimed in claim 7, wherein the member is biassed away from the plate and is urged towards the plate by an electromagnet.

12. A camera as claimed in claim 11, wherein the member comprises a control plate extending generally perpendicular to the plane of the shutter plates and pivoted at one edge, a spring biassing the control plate away from the shutter plates against a stop, and the electromagnet has a pole mounted on the side of the control plate adjacent the shutter plates.

13. A camera as claimed in claim 11, wherein a plate is at least partially formed of magnetic material to be attracted by the electromagnet.

14. A camera as claimed in claim 13 wherein the plate is pulled against a wall of the camera housing or other surface to arrest the plate by friction, the plate remaining separated from poles of the electromagnet.

15. A camera as claimed in claim 1, wherein a plate is at least partially formed of magnetic material and the aperture control means comprises an electromagnet which is actuated to attract the plate to arrest its movement.

16. A camera as claimed in claim 1, wherein the position of a plate is sensed prior to actuation of the control means to stop the plates.

17. A camera as claimed in claim 16, wherein the position of a plate is sensed by the plate entering a beam of light detected by a photodiode or the like.

* * * * *